(12) United States Patent
Terrill et al.

(10) Patent No.: US 7,208,853 B2
(45) Date of Patent: Apr. 24, 2007

(54) FASTENER ASSEMBLY

(75) Inventors: Andrew B. Terrill, Chippewa Falls, WI (US); Wayne M. Hansen, Chippewa Falls, WI (US); Brock T. Cooley, Bloomer, WI (US); David W. Edland, Chippewa Falls, WI (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 11/526,402

(22) Filed: Sep. 25, 2006

(65) Prior Publication Data

US 2007/0018519 A1 Jan. 25, 2007

(51) Int. Cl.
*H02K 5/24* (2006.01)

(52) U.S. Cl. ............................ 310/51; 310/91; 248/638; 24/453

(58) Field of Classification Search ............ 310/51, 310/91
See application file for complete search history.

(56) References Cited

U.S. PATENT DOCUMENTS

| 3,964,364 | A | * | 6/1976 | Poe .............................. 411/43 |
| 4,442,571 | A | * | 4/1984 | Davis et al. ................. 411/552 |
| 5,049,770 | A | * | 9/1991 | Gaeth et al. ................... 310/89 |
| 6,409,446 | B1 | * | 6/2002 | Schwarz ...................... 411/552 |

* cited by examiner

*Primary Examiner*—Burton Mullins
(74) *Attorney, Agent, or Firm*—Mark W. Croll; Paul F. Donovan

(57) ABSTRACT

A fastener assembly includes a grommet, a dampening subassembly, and a pin. The pin is secured to the grommet and the dampening subassembly. The pin is configured to rotate between a locked position and an unlocked position with respect to the grommet. The pin secures to the grommet in the locked position, and is removable from the grommet in the unlocked position.

5 Claims, 11 Drawing Sheets

FASTENER ASSEMBLY

RELATED APPLICATIONS

This application relates to and claims priority benefits from U.S. Provisional Patent Application 60/75,795 entitled "Pin And Grommet Assembly," filed Apr. 28, 2005, which is incorporated by reference herein in its entirety.

FIELD OF THE INVENTION

Embodiments of the present invention generally relate to fasteners, and more particularly, fastening systems including a pin and grommet.

BACKGROUND OF THE INVENTION

Grommet assemblies that may be used for mounting a motor to a support surface are known. For example, U.S. Pat. No. 4,522,378, entitled "Wiper Motor Mounting Grommet" (the '378 patent) discloses a one-piece integral resilient grommet of elastomeric material. The '378 patent describes a typical grommet assembly that isolates the vibration and noise that is propagated from a motor. The grommet disclosed in the '378 patent may be used with electric motor assemblies including fractional horsepower engines, such as those used with rear windshield wiper systems of certain vehicles.

FIG. 1 illustrates an isometric exploded view of a conventional grommet assembly 10, such as shown and described in the '378 patent. The assembly 10 includes a rivet nut 12, a metal bushing 14, a rubber dampener 16, and a metal bolt 18. A supplier receives the metal bushing 14 and the dampener 16 and assembles them with respect to a motor assembly. The supplier then provides the motor assembly, including the metal bushing 14 and the dampener 16, to an original equipment manufacturer (OEM).

The OEM then further secures the separate rivet nut 12 and the metal bolt 18 to the metal bushing 14 and the dampener 16. In particular, the rivet nut 12 is inserted and installed to sheet metal by a first operator at a first station. Typically, the rivet nut 12 is positioned with respect to the sheet metal and engaged with a rivet gun to bond the rivet nut 12 to the sheet metal. Then, a second operator locates the motor assembly to the sheet metal, and locates and pre-dives the metal bolt 18 at separate locations. The second operator then drives the metal bolts 18 to the specified torque rating, at which point the assembly process is complete.

Typically, a supplier utilizes a certain number of components, for example, seven components, i.e., one motor, three bushings, and 3 dampeners, and three assembly operations (one for each location). Additionally, the OEM typically utilizes a certain number of components, for example, seven components, i.e., one motor, three metal nuts, and three metal bolts) and a certain number of assembly operations, for example, ten assembly operations. If the motor assembly is to be serviced, each metal bolt 18 is rotated numerous times until it disengages from each corresponding rivet nut 12 in order to remove the motor assembly from the structure to which it is secured (such as a piece of sheet metal).

Overall, the process of assembling a conventional grommet assembly to a motor may be time and labor intensive. Further, the process of servicing a motor that is secured to a structure with conventional grommet assemblies is also time and labor intensive due to the fact that an operator engages each bolt separately with a tool and rotates each bolt numerous times to remove the motor from the structure.

Thus, a need exists for an improved assembly that allows for efficient assembly. Additionally, a need exists for an assembly that allows a device, such as a motor assembly to be quickly and easily removed from a structure to which it is secured.

SUMMARY OF THE INVENTION

Certain embodiments of the present invention provide a fastener assembly that is configured to secure a device, such as a motor assembly, to a structure, such as a piece of sheet metal. The fastener assembly includes a grommet, a dampener, a bushing, and a pin, all of which may include cored-out portions. The fastener assembly may be shipped to an original equipment manufacturer as a single unit.

The grommet includes at least one pin retention member. The dampener includes a generally cylindrical main body having at least one groove configured to retain a reciprocal feature of the structure. The bushing is secured within the dampener. In particular, the bushing may be molded with the dampener.

The pin is rotatably secured to the grommet by the pin retention member securing to the detent. The pin snapably secures to the bushing through a securing interface. The pin rotates between a locked position and an unlocked position with respect to the grommet. The pin secures to the grommet in the locked position, and is removable from the grommet in the unlocked position. The securing interface between the bushing and the pin may be broken when the pin rotates relative to the bushing.

The pin retention member may include pin retention legs having ends canted toward the pin. The detent may include retention recesses. The ends may be secured within the retention recesses in the locked position, and rotation of the pin into the unlocked position spreads the pin retention legs open, thereby removing the ends from the retention recesses.

The grommet may also include flex arms configured to secure the grommet within a hole of the structure. The pin includes a shank having an intermediate clearance portion, which may have an hourglass shape. The intermediate clearance portion allows the flex arms to flex toward the pin without the flex arms engaging the pin.

The pin may also include at least one pin stop block, and the grommet may also include at least one grommet stop block. The locked or unlocked position may be indicated when the pin stop block abuts the grommet stop block upon rotation of the pin.

Figure 1:
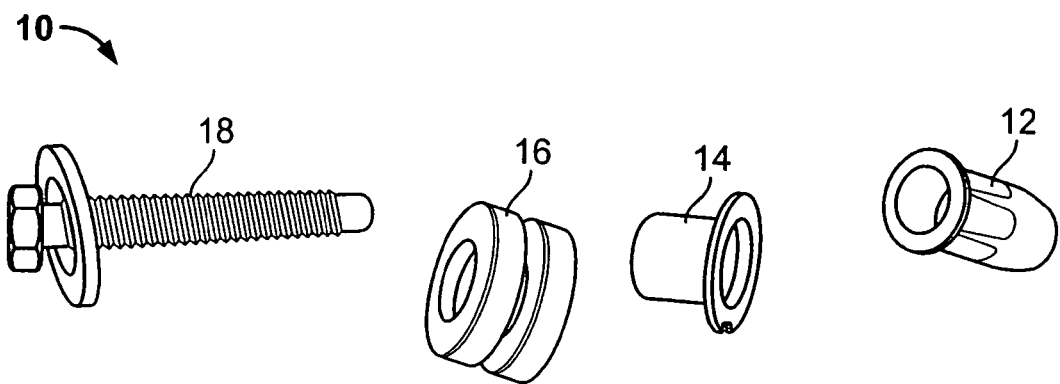
FIG. 1 illustrates an isometric exploded view of a conventional grommet assembly.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 2:
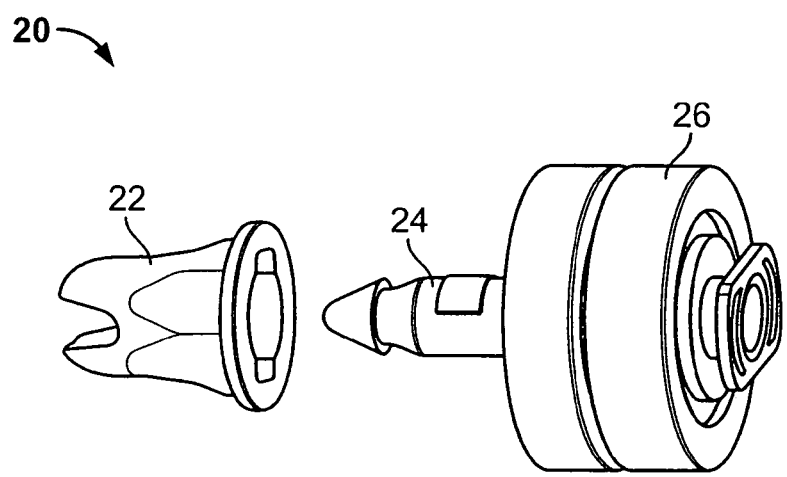
FIG. 2 illustrates an isometric partially-exploded view of a fastener assembly according to an embodiment of the present invention.

FIG. 2 illustrates an isometric partially-exploded view of a fastener assembly 20 according to an embodiment of the present invention. The assembly 20 includes a grommet 22, and a pin 24 secured within a dampening assembly 26. The pin 24 is configured to be removably and rotatably secured, such as by snap engagement, to the grommet 22. A parts manufacturer provides the fastener assembly 20 as shown in FIG. 1 to a supplier or distributor. The pin 24 may be assembled to the dampening assembly 26 prior to the pin 24 being secured to the grommet 22. Optionally, the fastener assembly 20 may be shipped with the grommet 22 attached to the pin 24, which is in turn secured to the dampening assembly 26. Alternatively, the fastener assembly 20 may be shipped such that the grommet 22 is not attached to the pin 24.

Figure 3:
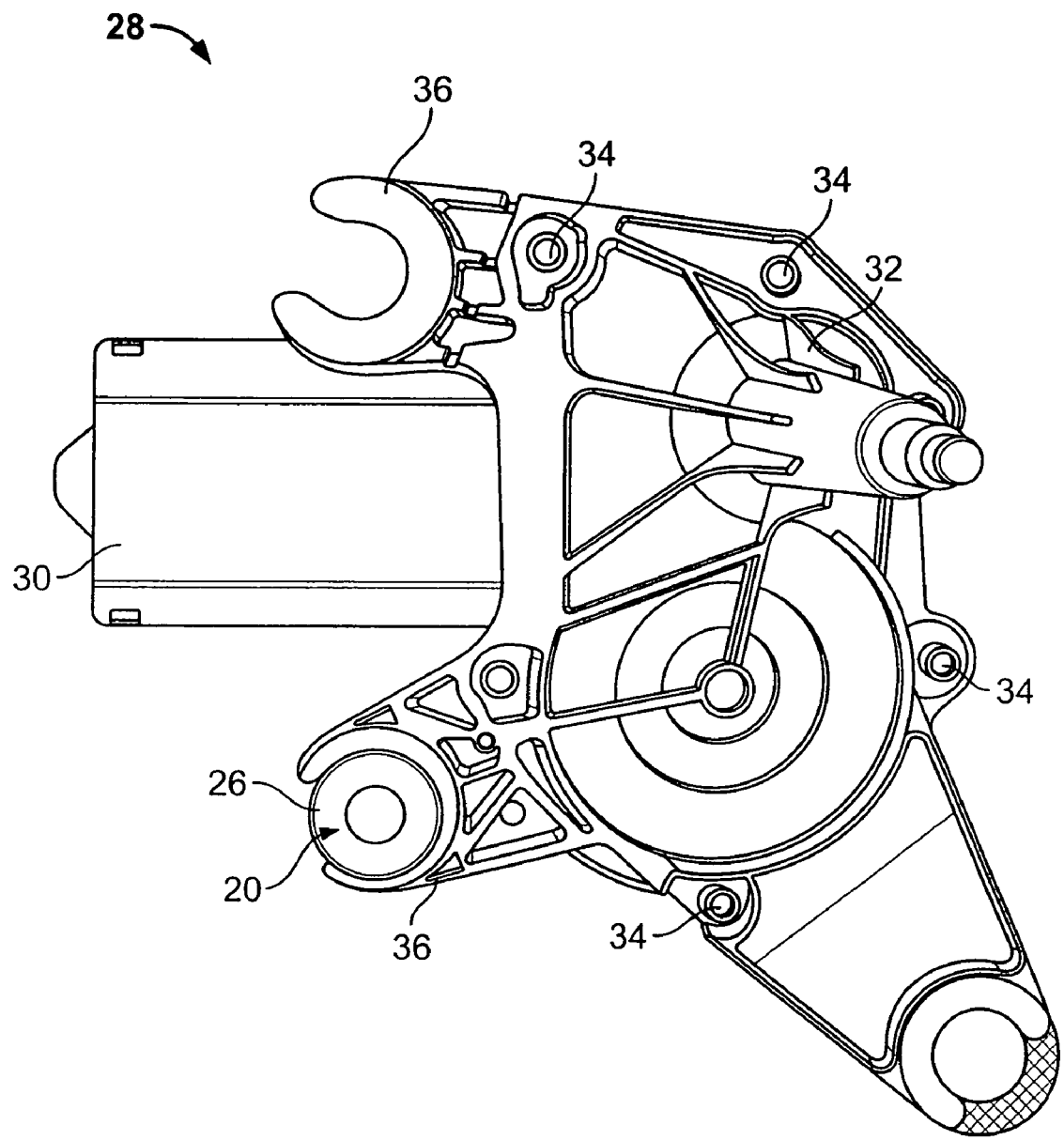
FIG. 3 illustrates a motor assembly according to an embodiment of the present invention.

FIG. 3 illustrates a motor assembly 28 according to an embodiment of the present invention. The motor assembly 28 includes a motor 30 mounted to a rigid plastic mounting bracket 32 by metal bolts 34. For example, the motor 30 may be secured to the plastic mounting bracket 32 by any number of bolts 34, such as five or six. The mounting bracket 32 includes c-shaped mounting flanges 36 configured to receive and retain the fastener assembly 20. The dampening assembly 26 of the fastener assembly 20 may collapse as it is inserted through the open end of the rigid mounting flange 36. The dampening assembly 26 is securably retained within the mounting flange by compression and friction between the dampening assembly 26 and the mounting flange 36.

Figure 4:
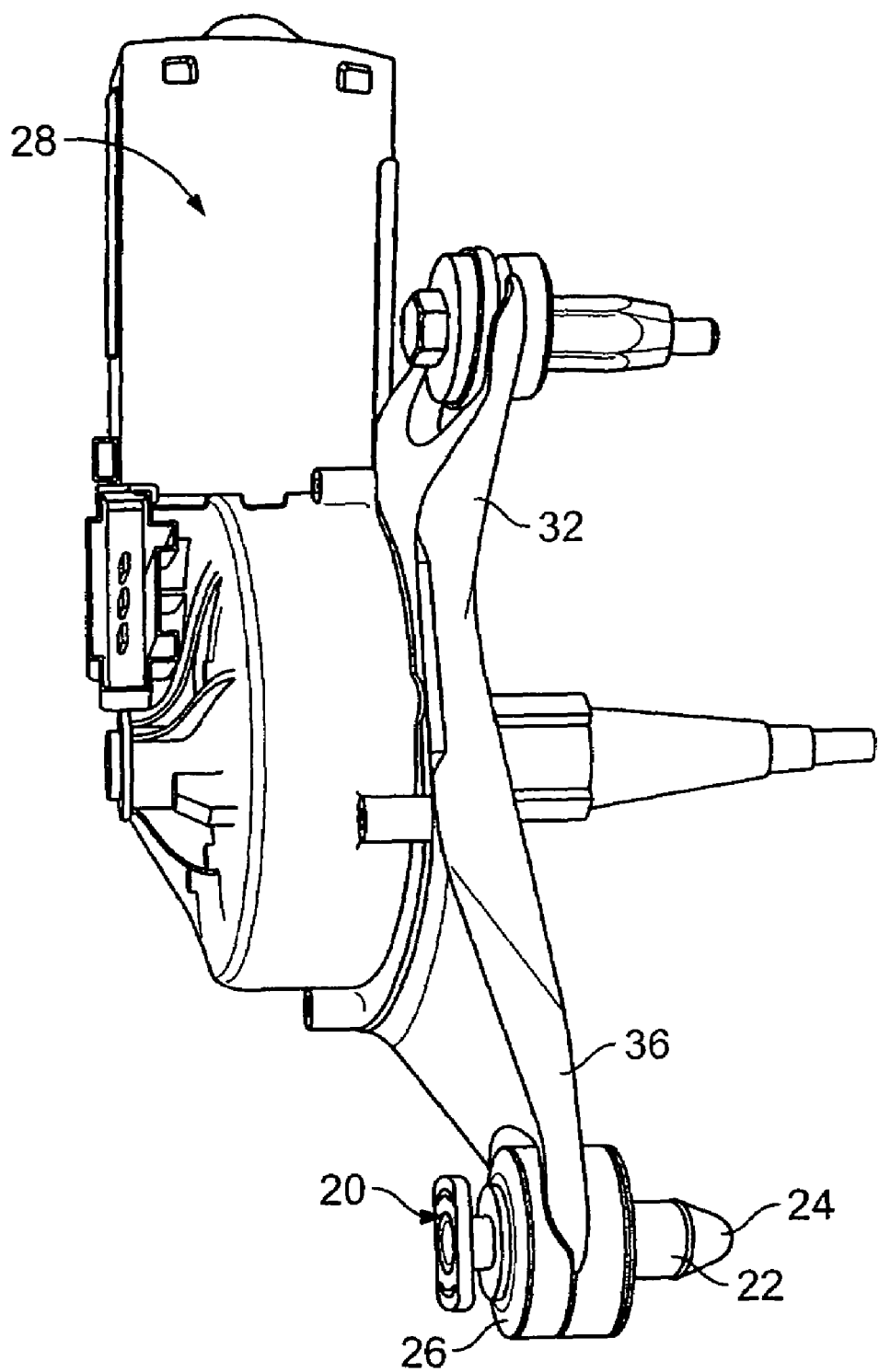
FIG. 4 illustrates an isometric view of a dampening assembly securably retained within a mounting flange of a motor assembly according to an embodiment of the present invention.

FIG. 4 illustrates an isometric view of the dampening assembly 26 securably retained within the mounting flange 36 of the motor assembly 28. The supplier assembles the dampening assembly 26, which securably retains the pin 24. The supplier then mounts the assembled fastener assembly 20 into the mounting flange 36. The grommets 22 may or may not be secured to the pins 24 at this stage. The supplier then provides the motor assembly 28, including the fastening assemblies 20, to the OEM assembly plant. As such, the OEM assembly plant receives a single motor assembly 28 having a plurality of fastening assemblies 20 already installed. An operator at the OEM assembly plant may then install the motor assembly 28 to sheet metal, or another such structure, by engaging the pins 24 of each fastener assembly 20 at each fastener location.

Thus, embodiments of the present invention provide an assembly process that may include seven components, i.e., one motor assembly 28, three pin 24 and dampener assemblies 26, and three grommets 22. The pins 24 may be secured to the grommets 22, and the resulting fastening assemblies 20 are then installed at corresponding portions, i.e., mounting flanges 36, of the motor assembly 28. The OEM assembly plant then receives the completed motor assembly 28 and an operator performs simple assembly operations, such as engaging each pin 24 to secure them to appropriate fastening locations, to secure the motor assembly 28 to a suitable material, such as sheet metal.

Figure 5:
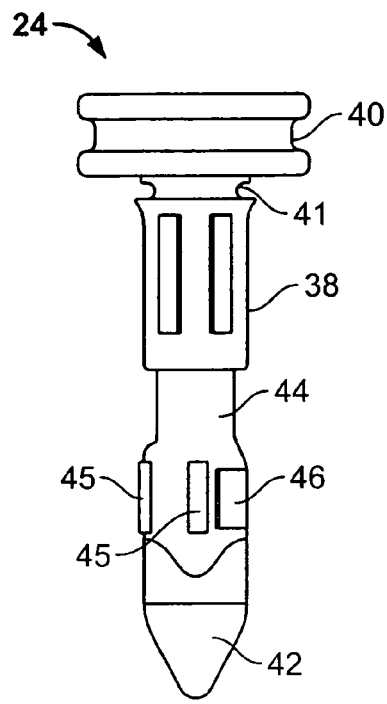
FIG. 5 illustrates a front view of a pin according to an embodiment of the present invention.

FIG. 5 illustrates a front view of the pin 24. The pin 24 includes a shank 38 integrally formed with a engagement knob 40 at an upper end, and a mating tip or nose 42 at a lower end. A retainer recess 41 is formed between the engagement knob 40 and the shank 38. The engagement knob 40 is configured to be manipulated by an operator to secure and remove the fastener assembly 20 (shown in FIGS. 2–4) from a reciprocal structure, such as a hole in sheet metal. The shank 38 is generally a longitudinal body having a reduced, hour-glass intermediate clearance portion 44 integrally formed with an elliptical camming portion 46. The intermediate clearance portion 44 allows clearance behind panel retention legs, as discussed below. As shown in FIG. 5, the front profile of the elliptical camming portion 46 is relatively straight. That is, there are no notches formed between the mating tip 42 and the camming portion 46.

The axial cross-section of the shank 38 of the pin 24 may be triangular, rectangular, pentagonal, hexagonal, or the like, so that the shank 38 does not inadvertently rotate while secured to the grommet 22, as discussed below. Alternatively, the shank 38 may be a smooth cylinder.

Figure 6:
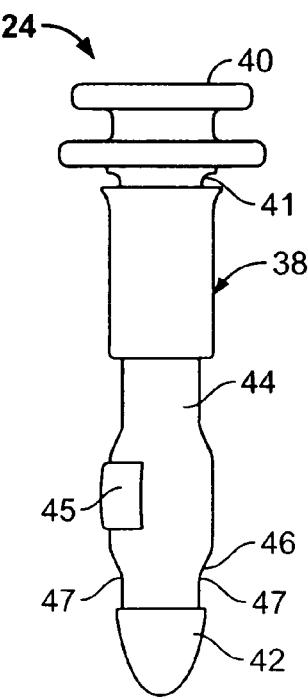
FIG. 6 illustrates a side view of a pin according to an embodiment of the present invention.

FIG. 6 illustrates a side view of the pin 24. As shown in FIG. 6, the side profile of the camming portion 46 includes retaining recesses, divots, catches, or other such detents 47 configured to snapably retain reciprocal structures on the grommet 22 (shown, for example, in FIG. 2). Thus, in one position (as shown in FIG. 5), the camming portion 46 does not have any features to engage or retain reciprocal structures on the grommet 22. However, when the pin 24 is rotated, the retaining recesses 47 of the camming portion 46 come into contact with reciprocal structures on the grommet 22, as discussed below, thereby securing the pin 24 to the grommet 22.

While the pin 24 is described as having a shank 38, and particularly a camming portion 46, having an elliptical axial cross-section (that is, having first axis having a first length, and a second axis having a second length, which is different from the first length), the shank 38 and camming portion 46 may be of various shapes having variable radii. For example, the camming portion 46 may be triangular. The shape of the camming portion 46 is such that it provides a cam action when rotated, thereby spreading reciprocal structures on the grommet 22 in order to allow the pin 24 to be removed from a reciprocal structure, such as a hole formed in sheet metal.

As shown in FIG. 5 and 6, a series of stop blocks 45 may extend outwardly from the shank 38. The stop blocks 45 are configured to engage corresponding structures within the grommet 22 (shown, for example, in FIG. 2) to notify an operator when the pin 24 is in an unlocked position and/or locked position with respect to the grommet 22, as discussed below with respect to FIGS. 18 and 19.

Figure 7:
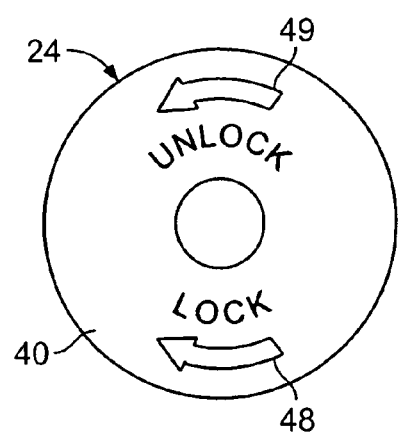
FIG. 7 illustrates a plan view of an engagement knob of a pin according to an embodiment of the present invention.

FIG. 7 illustrates a plan view of the engagement knob 40 of the pin 24. The engagement knob 40 is ergonomically designed to allow for easy manipulation by an operator. That is, the engagement knob 40 is large enough to be grasped between a thumb and an index finger, and configured to be easily rotated by a force exerted by the thumb and index finger. The engagement knob 40 may include a lock arrow 48 and an unlock arrow 49 in order to instruct an operator how to lock and unlock the fastener assembly 20 (shown in FIG. 2–4). While the lock arrow 48 and the unlock arrow 49 are shown in particular directions, the pin 24 may be configured so that the directions are reversed.

Figure 8:
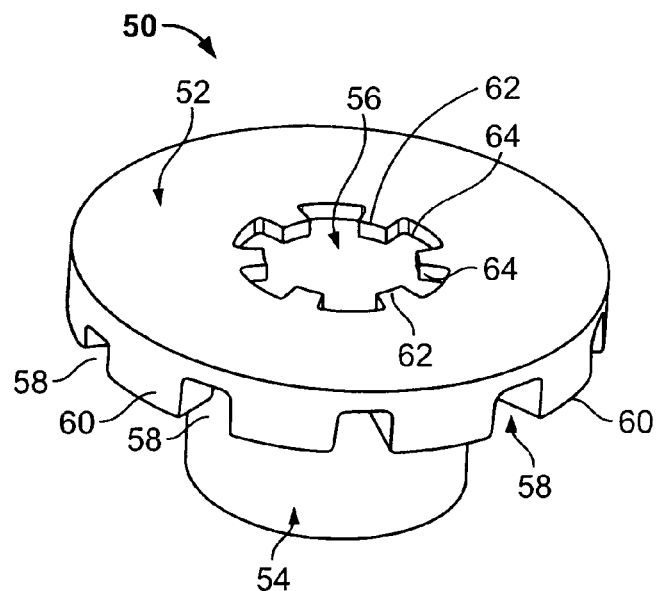
FIG. 8 illustrates an isometric view of a bushing according to an embodiment of the present invention.

FIG. 8 illustrates an isometric view of a bushing 50 according to an embodiment of the present invention. The bushing 50 includes a planar surface, such as a ledge 52, integrally formed with a cylindrical housing 54. A pin passage 56 is formed through the ledge 52 and the cylindrical housing 54. A series of notches 58 are formed between blocks 60 extending underneath the ledge 52. The pin passage 56 includes a plurality of inwardly extending tabs 62 separated by notches 64.

Figure 9:
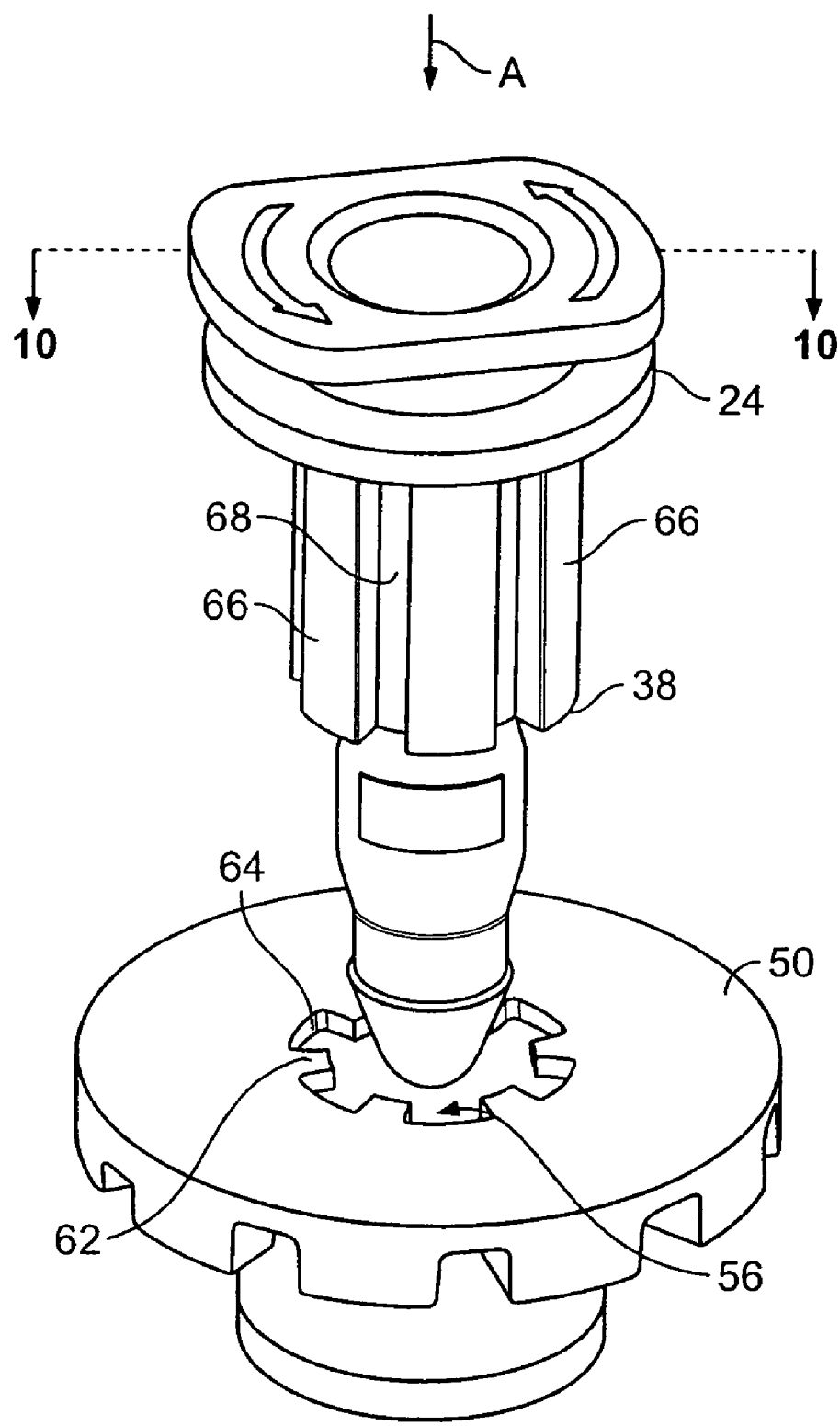
FIG. 9 illustrates an isometric view of a pin mating with a bushing according to an embodiment of the present invention.

FIG. 9 illustrates an isometric view of the pin 24 mating with the bushing 50. The pin 24 is urged into the bushing 50 in the direction of arrow A. As the pin 24 is slid into the pin passage 56, outwardly extending ribs 66 formed on the shank 38 are mated into the notches 64 formed in the pin passage 56. At the same time, the tabs 62 mate with channels 68 formed between the ribs 66 of the shank 38. The mating between the ribs 66 and the notches 64, and the tabs 62 and channels 68 interlocks the pin 24 to the bushing 50.

Figure 10:
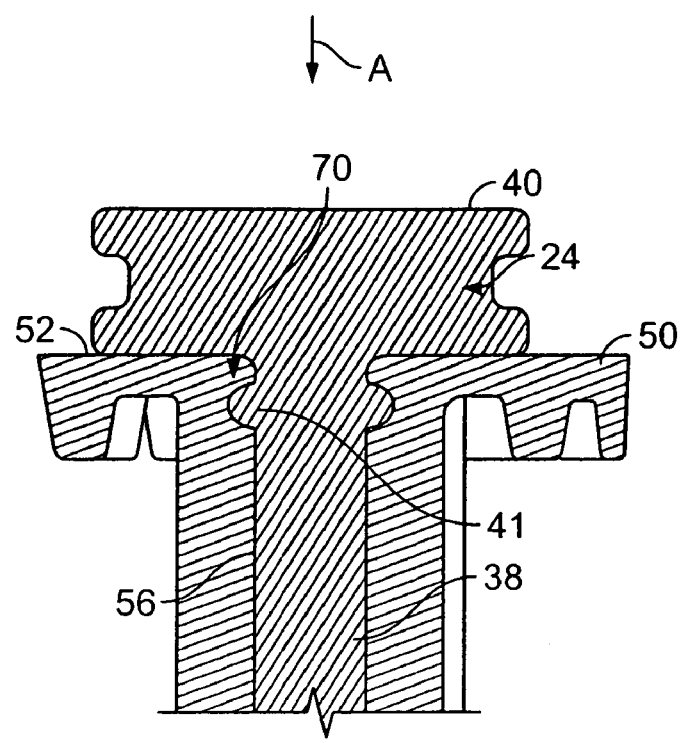
FIG. 10 illustrates a cross-sectional view of a pin and bushing through line 10—10 of FIG. 9.

FIG. 10 illustrates a cross-sectional view of the pin 24 and the bushing 50 through line 10—10 of FIG. 9. The pin 24 is urged into the bushing 50 until the engagement knob 40 abuts the ledge 52. The bushing 50 also includes a retainer ring 70 formed around the pin passage 56 proximate the ledge 52. The retainer ring 70 snapably engages the retainer recess 41 of the pin 24, thereby snapably securing the bushing 50 to the pin 24. However, the interface between the retainer ring 70 and the retainer recess 41 may be configured to break when the pin 24 is rotated relative to the bushing 50. That is, when the pin 24 is rotatably secured to the grommet 22 (shown, for example, in FIG. 2), and the bushing 50 is secured within the dampening assembly 26, which is in turn secured to the motor assembly 28 (shown, for example, in FIG. 2), a rotation of the pin 24 with respect to the grommet 22 may break the securing interface between the bushing 50, which may be fixed in position, and the pin 24. Thus, the securing interface between the bushing 50 and the pin 24 acts as a tether to secure the pin 24 to the bushing 50 during shipping, but not necessarily when the fastener assembly 20 (shown, for example, in FIG. 2) securely connects the motor assembly 28 to a piece of sheet metal. While the pin 24 and the bushing 50 are shown as two separate pieces, the pin 24 may alternatively be integrally formed with the bushing 50 as a single molded unit.

Figure 11:
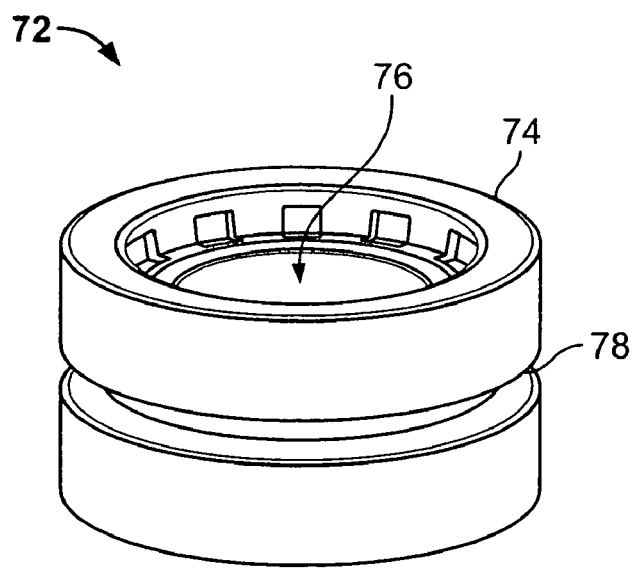
FIG. 11 illustrates an isometric view of a dampener according to an embodiment of he present invention.

FIG. 11 illustrates an isometric view of a dampener 72 according to an embodiment of he present invention. The dampener 72 may be molded around the bushing 50 (shown, for example, in FIG. 8). Molding the dampener 72 in this fashion saves manufacturing cost and time. Alternatively, the dampener 72 and the bushing 50 may be individual components assembled together.

The dampener 72 includes a main body 74 that may be formed of an resilient material, such as plastic or rubber, that is capable of absorbing vibrations, such as those caused by resonance within a motor. The main body 74 is generally cylindrical in nature and includes a bushing cavity 76 formed therethrough. A groove 78 is formed through and around a mid-section of the dampener 72. The groove 78 is configured to be received and retained by a reciprocal structure, such as a ridge, formed within the mounting flange 36 (shown, for example, in FIGS. 3 and 4) of the motor assembly 28 (shown, for example, in FIGS. 3 and 4).

Figure 12:
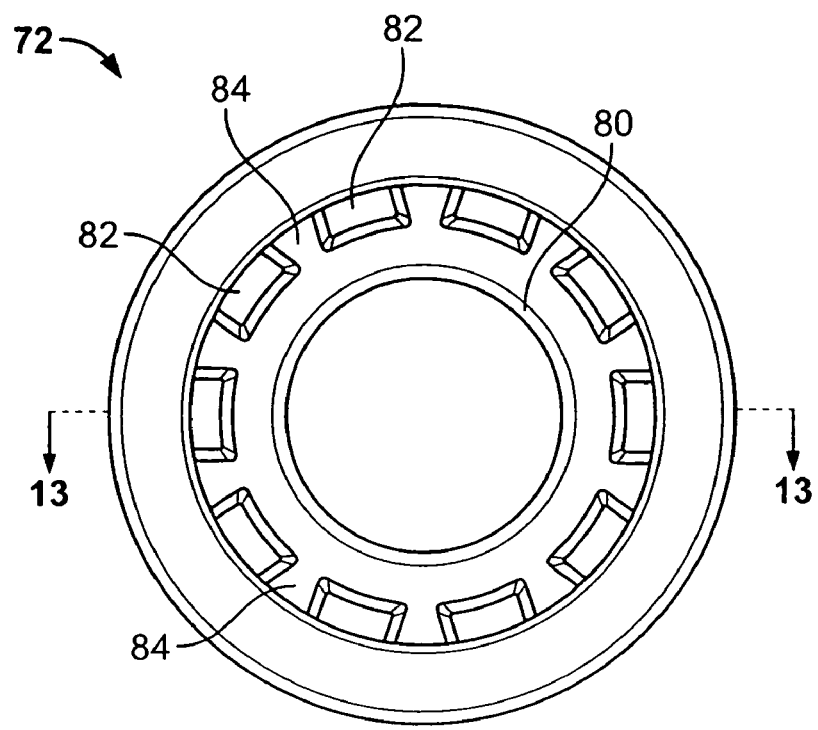
FIG. 12 illustrates a plan view of a dampener according to an embodiment of the present invention.

FIG. 12 illustrates a plan view of the dampener 72. A circumferential bushing ledge 80 is formed within the bushing cavity 76 and includes a plurality of inwardly-extending blocks 82 separated by spaces 84. Optionally, the blocks 82 may be spaces that are separated by elastomeric walls, which may take the place of spaces 84. The blocks 82 and spaces 84 are configured to cooperate with the notches 58 (shown, for example, in FIG. 8) and blocks 60 (shown, for example, in FIG. 8), respectively, of the bushing 50 (shown, for example, in FIG. 8) in order to retain the bushing 50 within the dampener 72.

Figure 13:
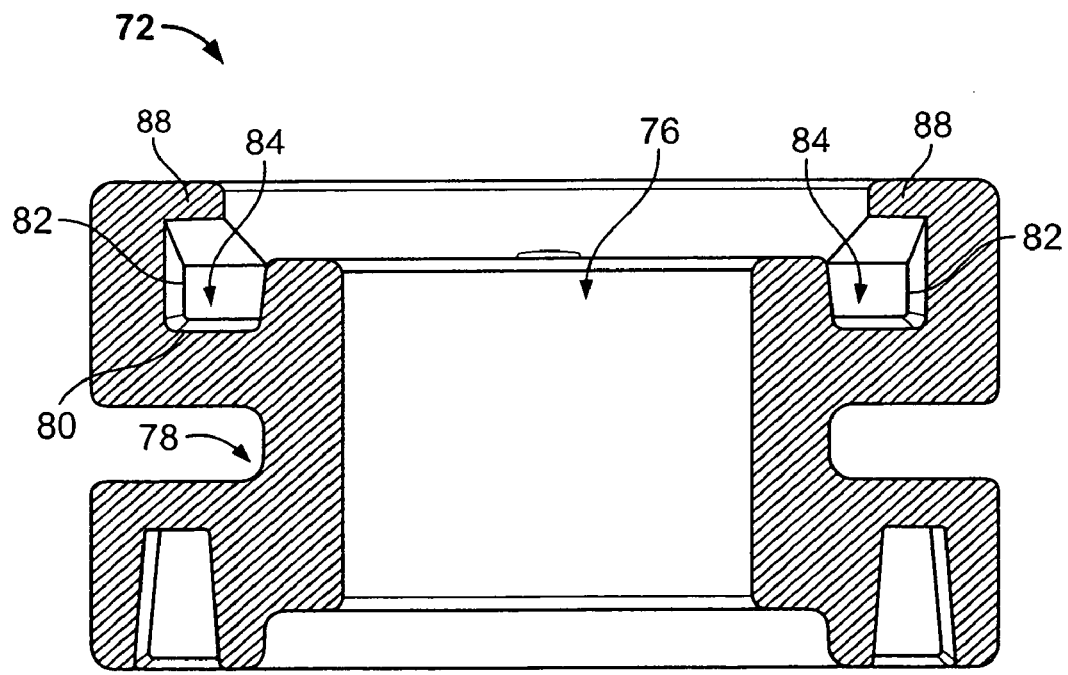
FIG. 13 illustrates a cross-sectional view of a dampener through line 13—13 of FIG. 12.

FIG. 13 illustrates a cross-sectional view of the dampener 72 through line 13—13 of FIG. 12. As noted above, the bushing 50 shown in FIG. 8 is configured to be retained within the bushing cavity 76. A resilient ridge 88 overhanging portions of the blocks 82 and spaces 84 is configured to snap over the ledge 52 (shown in FIG. 8) of the bushing 50 in order to snapably secure the bushing 50 within the dampener 72 (as shown, for example, in FIG. 17) so that the bushing 50 does not rotate relative to the dampener 72. The dampener 72 mates with the bushing 50 to form the dampening assembly 26 (shown in FIG. 2). While the bushing 50 and the dampener 72 are shown as separate and distinct components, the dampening assembly 26 may be molded as a single piece in which the bushing 50 is integrally formed with the dampener 72.

Figure 14:
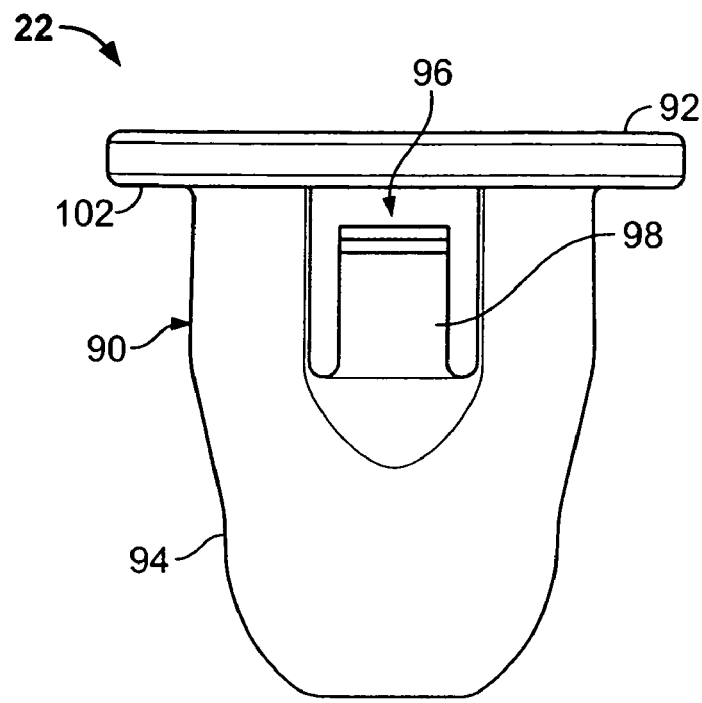
FIG. 14 illustrates a front view of a grommet according to an embodiment of the present invention.
Figure 15:
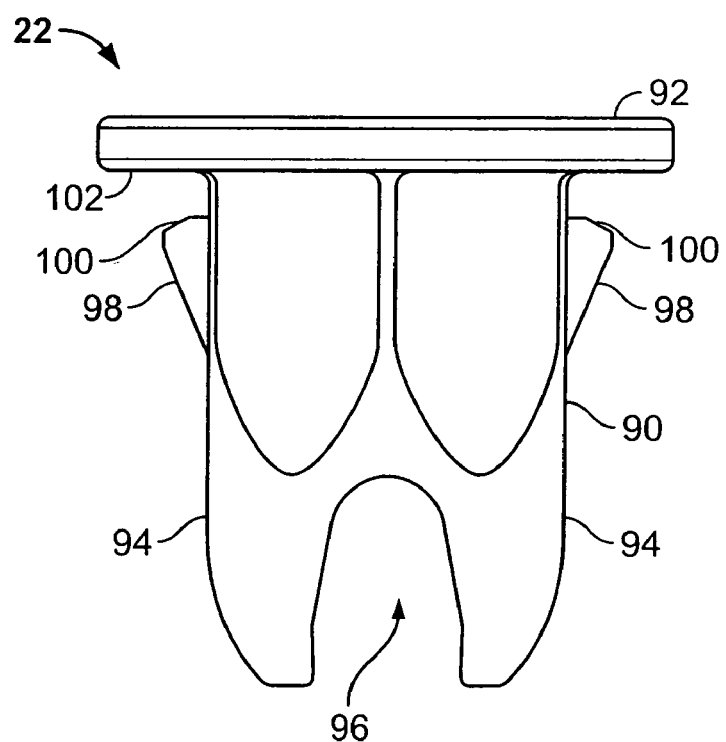
FIG. 15 illustrates a side view of a grommet according to an embodiment of the present invention.
Figure 16:
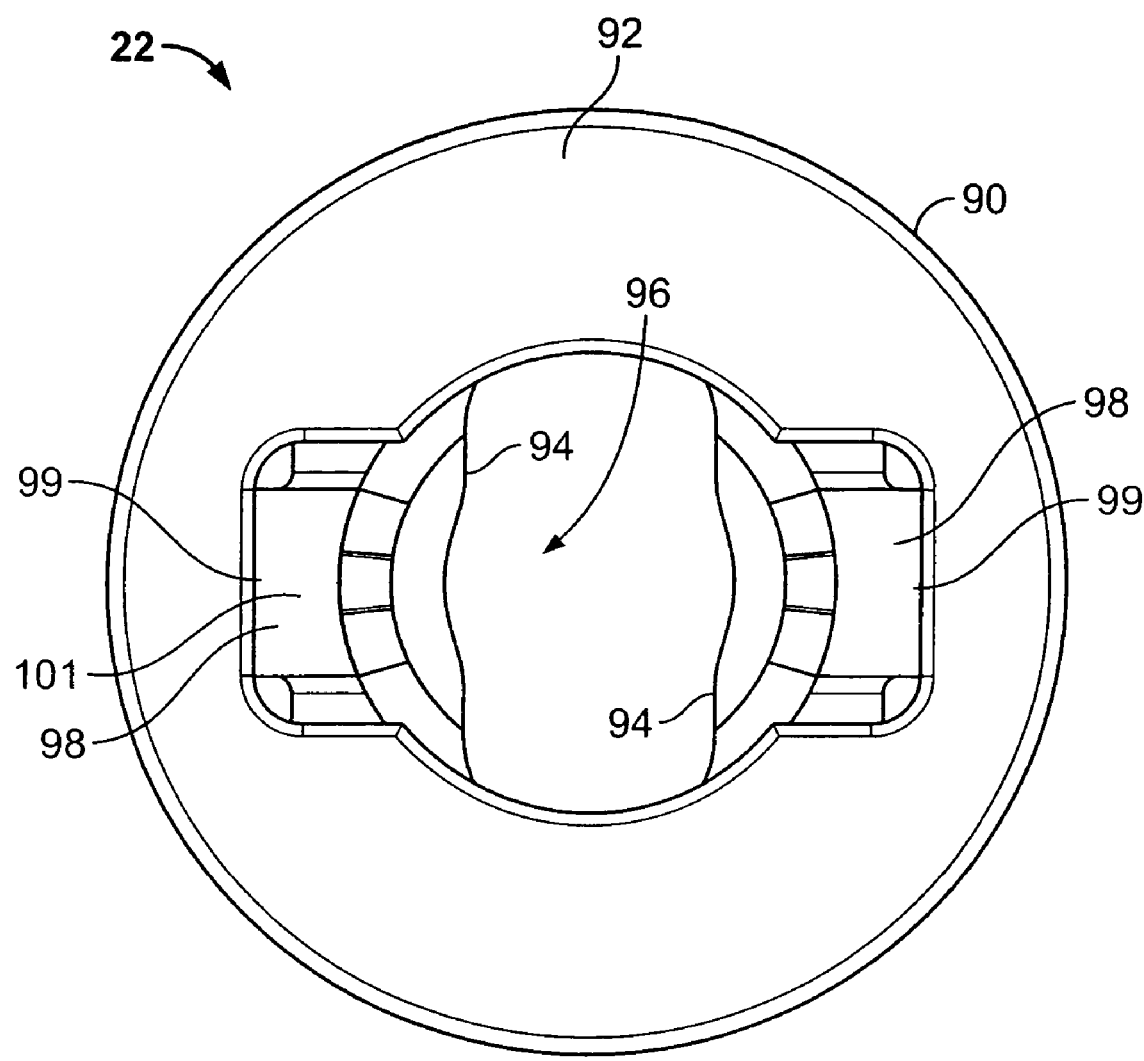
FIG. 16 illustrates a top plan view of a grommet according to an embodiment of the present invention.

FIGS. 14, 15, and 16 illustrate front, side, and top plan views, respectively, of the grommet 22. Referring to FIG. 14–16, the grommet 22 includes a main body 90 including a top planar head 92 integrally formed with opposed pin retention legs 94. A pin passage 96 is formed through the head 92 and between the pin retention legs 94. The pin 24 (shown, for example, in FIGS. 5 and 6) is configured to be retained within the pin passage 96 by the pin retention legs 94. The grommet 22 also includes flexible ramped members 98, which are integrally connected to the pin retention legs 94 and/or the main body 90, configured to snapably secure the grommet 22 to a piece of sheet metal with respect to a hole within the sheet metal. As such, the planar piece of sheet metal is secured between upper edges 100 of the ramped members 98 and a lower surface 102 of the head 92.

As shown in FIG. 16, in particular, top surfaces 99 of the ramped members 98 comprise recessed areas 101 configured to receive a distal end of a tool, such as a screwdriver, needle-nose pliers, or the like. The distal end of the tool may be positioned within the recessed areas 101 to manipulate the ramped members 98 in order to pivot them inwardly. As the ramped members 98 are inwardly pivoted, the upper edges 100 lose engagement with an underside of the planer sheet metal. The grommet 22 may then be removed from the sheet metal hole.

Figure 17:
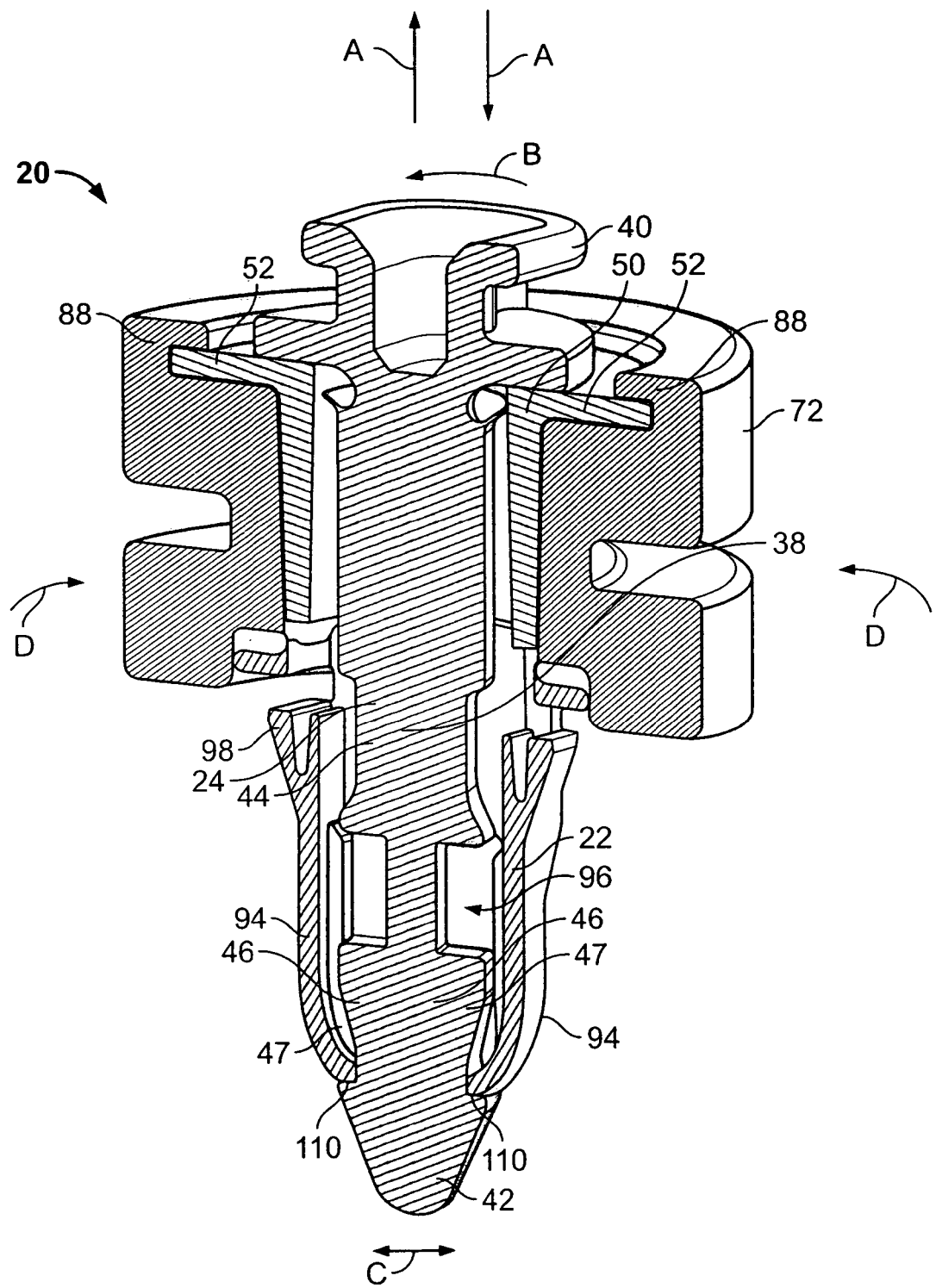
FIG. 17 illustrates a transverse cross-sectional view of a fastener assembly according to an embodiment of the present invention.

FIG. 17 illustrates a transverse cross-sectional view of the fastener assembly 20. As the mating tip 42 of the pin 24 is urged into the pin passage 96, the camming portion 46 contacts the pin retention legs 94. With continued urging in the direction of arrow A, the pin 24 rotates with respect to the grommet 22 until inwardly-canted ends 110 of the pin retention legs 94 encounter the retaining recesses 47 of the pin 24. At this point, the canted ends 110 snap into the retaining recesses 47. As such, the pin retention legs 94 of the grommet snapably retain the pin 24 by snapably mating into the retaining recesses 47. Thus, a fully assembled fastener assembly 20 may be manufactured. The fully-assembled fastener assembly 20 may then be secured within mounting flanges 36 (shown, for example, in FIG. 2) of the motor assembly 28 (shown, for example, in FIG. 2). An operator may then push the fastening assemblies 20 into reciprocal holes in sheet metal to secure the motor assembly thereto.

Optionally, the grommets 22 may be separately provided to an operator who may first position the grommets 22 in reciprocal holes of a structure, such as a planer piece of sheet metal. The pins 24, which are secured to the dampening assemblies 26, which are in turn secured to the motor assembly 28, may then be mated into the grommets 22. That is, the fastener assembly 20 may be provided to an OEM fully assembled with the grommet 22, or the grommet 22 may be separately provided to the operator.

As the fastener assembly 20 is urged into a hole, the ramped members 98 of the grommet 22 are forced inward in the direction of arcs D as they pass through the hole. However, the intermediate clearance portion 44 of the shank 38 ensures that the pin 24 does not interfere with, engage, abut, or snag the ramped members 98. That is, the intermediate clearance portion 44 allows clearance behind the ramped members 98 and the pin retention legs 94, thereby allowing those components to move toward the shank 38 without snagging, abutting, or otherwise engaging the shank 38. Thus, when the grommet 22 is installed into a metal sheet hole, the ramped members 98 are able to move inwardly, or flex, without hitting or crashing into the pin 24, thereby ensuring that the grommet 22 is properly secured within the sheet metal hole.

In order to remove the pin 24 from the grommet 22, a user manipulates the engagement knob 40 to rotate the pin 24 in the direction of arc B. As the pin 24 is rotated, the retaining recesses 47 are rotated out of engagement with the canted ends 110, and the increasing radius of the camming portion 46 of the pin 24 spreads the pin retention legs 94 open in the direction of arrow C. Once the canted ends 110 are fully removed from the retaining recesses 47, the pin 24 may be removed from the grommet 22 in the direction of arrow A'.

Figure 18:
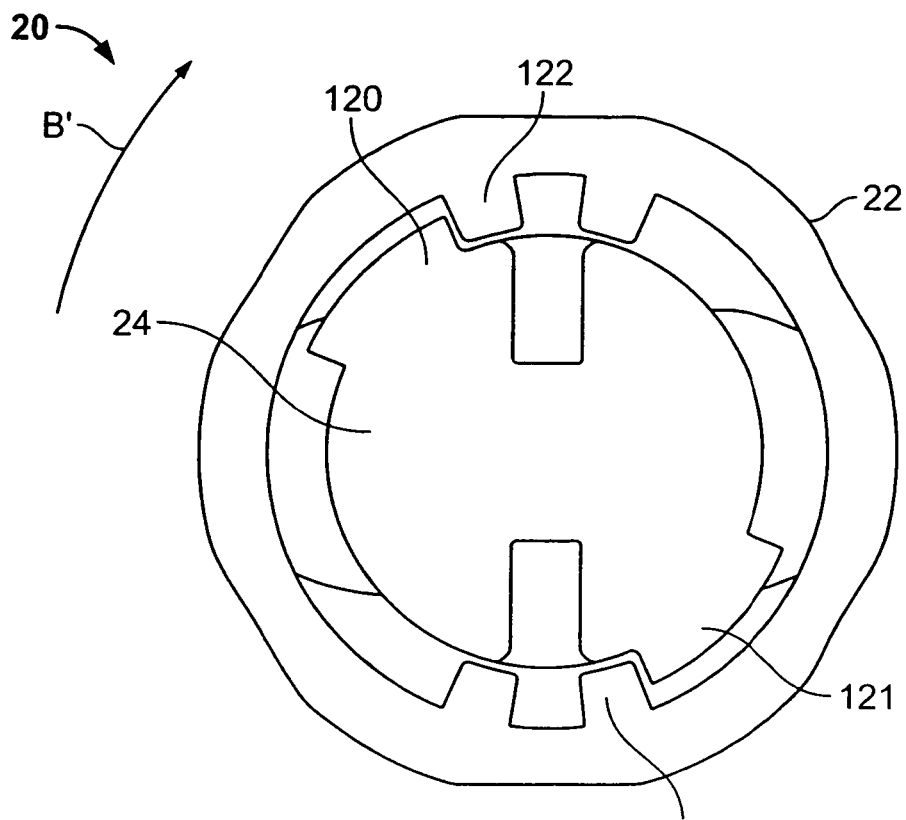
FIG. 18 illustrates an axial cross-sectional view of a pin in a locked position with respect to a grommet according to an embodiment of the present invention.

FIG. 18 illustrates an axial cross-sectional view of the pin 24 in a locked position with respect to the grommet 22. As shown in FIG. 18, the axial profiles of the pin 24 and the grommet 22 indicate that the pin 24 includes two outwardly-extending stop blocks 120 and 121 (which may be stop blocks 45 and 46 discussed above), while the grommet 22 includes two sets of inwardly-extending stop blocks 122 and 123. Optionally, the pin 24 may include sets of stop blocks, and/or the grommet 22 may include single stop blocks.

Referring to FIGS. 17 and 18, in the locked position, in which the retaining recesses 47 snapably retain the inwardly-canted ends 110 of the pin retention legs 94, the stop block 120 abuts against stop block set 122 while the stop block 121 abuts against the stop block set 123. As such, the pin 24 cannot be rotated any more in the direction of arc B', thereby indicating that the pin 24 is in a locked position.

When the pin 24 is rotated to spread the pin retention legs 94, energy is stored within the pin retention legs 94 in the form of a spring force. The pin retention legs 94 flex back to their original orientation to relieve the spring force. Thus, the pin 24 will automatically rotate back to a locked position. Therefore, the fastener assembly 20 includes a built-in return spring that ensures that the pin 24 is in the locked position unless there is an outside rotational force exerted on the pin, such as by an operator rotating the pin 24.

As mentioned above, the axial cross-section of the shank 38 of the pin 24 may be triangular, rectangular, pentagonal, hexagonal, or the like, so that the shank 38 does not inadvertently rotate while secured to the grommet 22, as discussed below. That is, the shank 38 may include distinct edges. A certain amount of force is used to rotate the pin 24 within the grommet 22 past these edges, thereby ensuring that the pin 24 does not inadvertently rotate with respect to the grommet 22.

Figure 19:
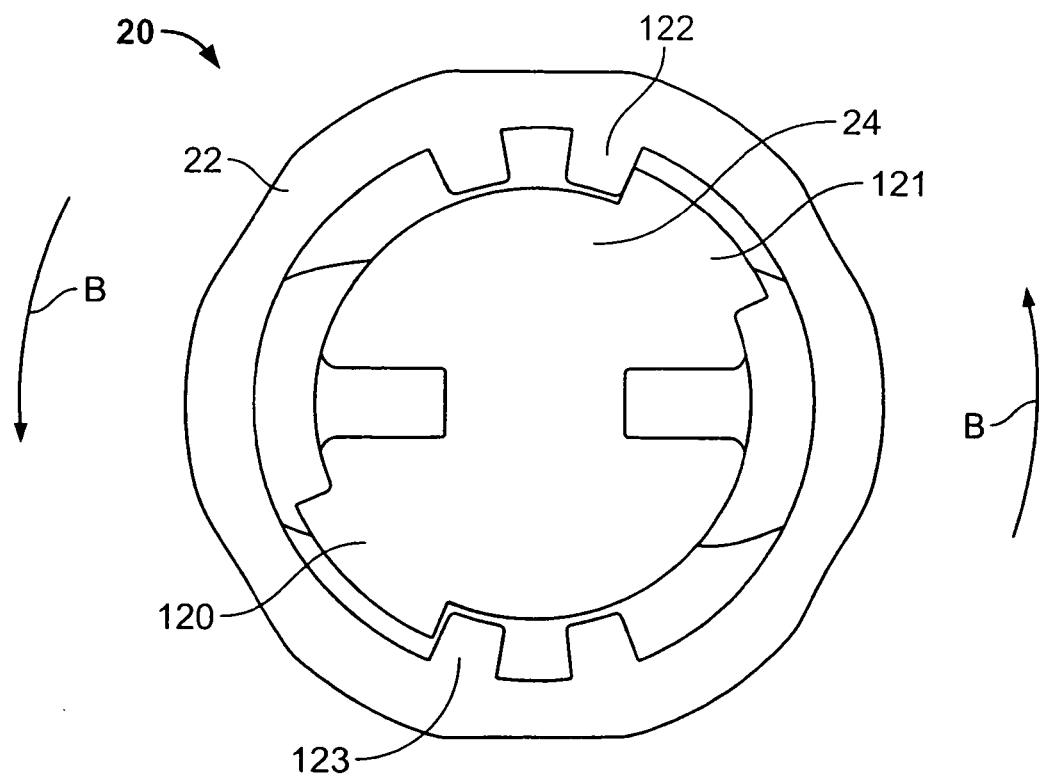
FIG. 19 illustrates an axial cross-sectional view a pin in an unlocked position with respect to a grommet according to an embodiment of the present invention.

FIG. 19 illustrates an axial cross-sectional view the pin 24 in an unlocked position with respect to the grommet 22. Referring to FIGS. 17 and 19, in order to unlock the pin 24 from the grommet 22 such that the inwardly-canted ends 110 are removed from the retaining recesses 47, the pin 24 is rotated in the direction of arc B. Once rotation of the pin 24 is stopped by the stop block 120 abutting against the stop block set 123 and the stop block 121 abutting against the stop block set 122, the pin 24 is in an unlocked position in which the inwardly-canted ends 110 of the grommet 22 are fully removed from the retaining recesses 47 of the pin 24. Thus, when the pin 24 can no longer be rotated in the direction of arrow B, the pin 24 is in an unlocked position with respect to the grommet 22.

While FIGS. 18 and 19 show locking and unlocking positions in specific directions, the fastener assembly 20 may be configured to lock and unlock in different directions. For example, the fastener assembly 20 may be configured such that the locking direction is denoted by arc B, while the unlocking direction is denoted by arc B'.

Additionally, while FIGS. 18 and 19 show that rotation from an unlocked position to a locked position is approximately 90°, the fastener assembly 20 may be configured otherwise. For example, the fastener assembly 20 may be configured to allow for an unlocking rotation of 30°, 45°, or various other radial distances.

Also, more or less stop blocks may be used with respect to the pin 24 and the grommet 22. For example, the pin 24 may include one stop block, while the grommet 22 includes one stop block.

Referring to FIG. 2–19, components of the fastener assembly 20 may include cored-out regions. For example, the pin 24, the bushing 50, and the dampener 72 may include cored-out regions, as shown. The cores are provided for manufacturing reasons in order to control the amount of axial shrink of the components. In short, all plastic parts shrink a small amount when they are removed from a mold.

The amount of shrinkage depends on the geometry (length and thickness) of the component. Pins, or any long cylinder, are susceptible to such shrinking. Thus, the cored-out regions assist in controlling the amount of shrinkage.

Thus, embodiments of the present invention provide an improved assembly that allows for efficient assembly. The embodiments of the present invention offer a reduced manufacturing cost when compared with conventional grommet assemblies due to less material handling and a reduced time of assembly. Additionally, embodiments of the present invention provide an assembly that allows for quick and easy removal of the device, such as a motor assembly, from another structure, such as a planar piece of about metal, in order to service or replace the device.

Additionally, while embodiments of the present invention are discussed with respect to motor assemblies, the fastening assemblies may be used with various other systems in order to fasten one structure to another. For example, the fastening assemblies may be used to securely connect components of furniture, signs, light fixtures, audio-visual equipment, and various other such objects and devices.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A motor assembly configured to be fastened to a piece of sheet metal, the motor assembly comprising:
   a motor;
   a mounting bracket having a plurality of mounting flanges, said motor being secured to said mounting bracket, each of said mounting flanges comprising a fastener assembly secured therein, said fastener assembly comprising:
   a grommet comprising at least one pin retention member and flex arms, said grommet configured to be secured within a hole formed in the piece of sheet metal through said flex arms;
   a dampener comprising a generally cylindrical main body having at least one groove configured to retain a reciprocal structure of the motor assembly;
   a bushing secured within said dampener; and
   a pin comprising a detent and a shank having an intermediate clearance portion, said intermediate clearance portion allowing said flex arms to flex toward said pin without said flex arms engaging said pin, said pin being rotatably secured to said grommet by said at least one pin retention member securing to said detent, said pin snapably securing to said bushing through a securing interface, said pin rotating between a locked position and an unlocked position with respect to said grommet, said pin securing to said grommet in said locked position, and said pin being removable from said grommet in said unlocked position.

2. motor assembly of claim 1, wherein said at least one pin retention member comprises pin retention legs having ends canted toward said pin, and said detent comprising retention recesses, said ends being secured within said retention recesses in said locked position, and wherein rotation of said pin into said unlocked position spreads said pin retention legs open thereby removing said ends from said retention recesses.

3. motor assembly of claim 1, wherein said securing interface between said bushing and said pin is broken when said pin rotates relative to said bushing.

4. motor assembly of claim 1, wherein at least one of said grommet, said dampener, said bushing, and said pin comprise cored-out portions.

5. The motor assembly of claim 1, wherein said pin comprises at least one pin stop block, and said grommet comprises at least one grommet stop block, wherein said at least one pin stop block abuts said at least one grommet stop block upon rotation of said pin to indicate at least one of said locked and unlocked positions.

* * * * *